United States Patent
Park et al.

(10) Patent No.: US 9,648,269 B2
(45) Date of Patent: May 9, 2017

(54) APPARATUS AND METHOD FOR DISPLAYING AN ENLARGED TARGET REGION OF A REPRODUCED IMAGE

(71) Applicant: Samsung Electronics Co., Ltd., Gyeonggi-do (KR)

(72) Inventors: Hyun-Hee Park, Seoul (KR); Jong-Man Kim, Gyeonggi-do (KR); Min-Woo Lee, Gyeonggi-do (KR); Yun-Je Oh, Gyeonggi-do (KR); Sung-Dae Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/249,993

(22) Filed: Apr. 10, 2014

(65) Prior Publication Data

US 2014/0218611 A1 Aug. 7, 2014

Related U.S. Application Data

(63) Continuation of application No. 12/476,620, filed on Jun. 2, 2009, now abandoned.

(30) Foreign Application Priority Data

Jul. 30, 2008 (KR) ........................ 10-2008-0074623

(51) Int. Cl.
*G06F 12/02* (2006.01)
*H04N 5/45* (2011.01)
(Continued)

(52) U.S. Cl.
CPC ............. *H04N 5/45* (2013.01); *G06F 3/0481* (2013.01); *G06F 3/0488* (2013.01); *G09G 5/14* (2013.01);
(Continued)

(58) Field of Classification Search
CPC ......... G06F 3/0488; G06F 2203/04807; G06T 2207/10016; G06T 2207/20104;
(Continued)

(56) References Cited

U.S. PATENT DOCUMENTS 6,388,684 B1 * 5/2002 Iwamura et al. ............. 715/788
6,597,736 B1 7/2003 Fadel
(Continued)

FOREIGN PATENT DOCUMENTS

CN 1423896 6/2003
CN 1908962 2/2007
(Continued)

OTHER PUBLICATIONS

European Search Report dated Jun. 13, 2016 issued in counterpart application No. 09803097.6-1905, 4 pages.

*Primary Examiner* — Ke Xiao
*Assistant Examiner* — Kim-Thanh T Tran
(74) *Attorney, Agent, or Firm* — The Farrell Law Firm, P.C.

(57) ABSTRACT

An apparatus and a method for selecting and displaying a particular region in a displayed image. A user selects a target region in an image displayed on an image reproduction apparatus, an image of the selected target region is enlarged and displayed in a window, which the user can adjust a generation position, a size, a zoom magnification, and a resolution thereof. The image reproduction apparatus tracks a target object in the target region, and enables the user to continuously view the target object in the window.

14 Claims, 6 Drawing Sheets

(51) Int. Cl.

| | |
|---|---|
| *G06F 3/0481* | (2013.01) |
| *G06F 3/0488* | (2013.01) |
| *G09G 5/14* | (2006.01) |
| *H04N 5/445* | (2011.01) |
| *H04N 21/431* | (2011.01) |
| *H04N 21/4402* | (2011.01) |
| *H04N 21/4728* | (2011.01) |
| *G09G 5/397* | (2006.01) |

(52) U.S. Cl.
CPC ..... *H04N 5/44591* (2013.01); *H04N 21/4316* (2013.01); *H04N 21/440263* (2013.01); *H04N 21/4728* (2013.01); *G06F 2203/04805* (2013.01); *G09G 5/397* (2013.01); *G09G 2320/103* (2013.01); *G09G 2340/045* (2013.01); *G09G 2340/0407* (2013.01); *G09G 2340/0464* (2013.01); *G09G 2340/12* (2013.01); *H04N 2005/44595* (2013.01)

(58) Field of Classification Search
CPC ............... G06T 3/40; G09G 2320/103; G09G 2340/045; G09G 2340/0464; G09G 2340/12
USPC ......... 345/671, 672, 676, 565, 633; 382/103
See application file for complete search history.

(56) References Cited

U.S. PATENT DOCUMENTS

| | | | |
|---|---|---|---|
| 6,958,749 | B1 | 10/2005 | Matsushita et al. |
| 6,970,181 | B1 | 11/2005 | Fadel |
| 2002/0075407 | A1 | 6/2002 | Cohen-Solal |
| 2004/0189804 | A1* | 9/2004 | Borden et al. ................. 348/169 |
| 2004/0258152 | A1* | 12/2004 | Herz ........................ 375/240.16 |
| 2006/0045381 | A1* | 3/2006 | Matsuo et al. ................ 382/276 |
| 2006/0072811 | A1 | 4/2006 | Porter et al. |
| 2007/0008338 | A1 | 1/2007 | Kim |
| 2007/0040898 | A1 | 2/2007 | Lee et al. |
| 2007/0098229 | A1 | 5/2007 | Wu et al. |
| 2007/0109324 | A1 | 5/2007 | Lin |
| 2007/0115371 | A1* | 5/2007 | Enomoto .................. G06T 5/00 348/222.1 |
| 2008/0079754 | A1* | 4/2008 | Kuroki .......................... 345/660 |
| 2008/0129855 | A1* | 6/2008 | Vitsnudel et al. ............ 348/302 |
| 2009/0009531 | A1 | 1/2009 | Sudo et al. |
| 2010/0013977 | A1* | 1/2010 | Suzuki ............... H04N 5/23212 348/333.11 |

FOREIGN PATENT DOCUMENTS

| | | |
|---|---|---|
| JP | 2007-272734 | 10/2007 |
| KR | 1020010010016 | 2/2001 |
| KR | 1020020056976 | 7/2002 |
| KR | 1020040075517 | 8/2004 |
| KR | 1020080034204 | 4/2008 |
| KR | 1020080040414 | 5/2008 |
| KR | 1020080052937 | 6/2008 |
| WO | WO 2008/072374 | 6/2008 |

* cited by examiner

APPARATUS AND METHOD FOR DISPLAYING AN ENLARGED TARGET REGION OF A REPRODUCED IMAGE

PRIORITY

This application is a Continuation Application of U.S. application Ser. No. 12/476,620, which was filed in the U.S. Patent and Trademark Office on Jun. 2, 2009, and claims priority under 35 U.S.C. §119(a) to a Korean Patent Application filed in the Korean Intellectual Property Office on Jul. 30, 2008 and assigned Serial No. 10-2008-0074623, the contents of each of which are incorporated herein by reference.

BACKGROUND OF THE INVENTION

1. Field of the Invention

The present invention relates generally to an apparatus and a method for enlarging a particular region of an image, and more particularly to an apparatus and a method for enlarging and displaying a particular region of an image while reproducing the image.

2. Description of the Related Art

Portable devices, such as Moving Picture Experts Group Audio Layer-3 (MP3) players, mobile terminals, Portable Multimedia Players (PMPs), etc., are constantly increasing in popularity. Consequently, the portable devices are constantly being improved to provide more user features. At an early stage, these improvements were limited to music listening or viewing images. However, now, the improvements extend into various fields, such as Internet, games, image communication, etc.

A portable device, such as a mobile terminal capable of displaying still images and video, provides various screen display methods. For example, the various screen display methods can include Picture In Picture (PIP), On-Screen Display (OSD), etc.

A PIP function provides another small screen on a larger screen, and can be used to display different images, e.g., from two different channels, on the two screens, respectively. The PIP function only has to display signals, which are output from two video decks, in a predetermined part of an image. Accordingly, the PIP function reproduces a second image in a fixed potion of the larger screen displaying a first image. Similar to the PIP function, a PIP type display is also used to simultaneously display a calling and called party on one screen for a videophone call. This technology can also be implemented by adding a hardware video codec.

An OSD function reconfigures two image sources into one image. For example, the OSD function is used when a mobile terminal simultaneously displays a user interface related to a menu with a broadcast screen.

The conventional PIP configuration displays images from two sources on an output screen simply by adding a hardware codec. In the PIP function, a user has difficulty adjusting the size and resolution of an image. Also, the user cannot change the position of a PIP window on a main screen.

The OSD function simply provides an overlapping function on a main screen. Accordingly, the OSD function does not change overlapping contents, and like the PIP function, is limited on position adjustment.

SUMMARY OF THE INVENTION

Accordingly, the present invention has been designed to solve the above-mentioned problems occurring in the prior art, and provides an apparatus and a method, wherein an image source is more conveniently displayed in a window set by a user in a large-sized reproduction device, such as a TV, and also in a small-sized display device, such as a mobile terminal.

Also, the present invention provides an apparatus and a method, wherein a particular region of a moving image is enlarged, thereby enabling a user to continuously view the enlarged particular region while reproducing the moving image.

Further, the present invention provides an apparatus and a method enabling a user to easily check user data on a small screen of a mobile terminal.

In accordance with an aspect of the present invention, there is provided a method displaying an enlarged target region of an image reproduced by an image reproduction apparatus. The method includes setting generation information on a window displayed on the reproduced image in such a manner that the window overlaps the reproduced image; designating a target region in the reproduced image; generating a window using the generation information on the window; and displaying an image of the designated target region in the generated window.

In accordance with another aspect of the present invention, there is provided an apparatus for displaying an enlarged target region of a reproduced image. The apparatus includes a window information generation unit for setting generation information on a window displayed on the reproduced image in such a manner that the window overlaps the reproduced image; a target region selection unit for receiving a target region that a user designates in the reproduced image; a window generation unit for generating a window using the generation information on the window; and an image processing unit for displaying an image of the designated target region in the generated window.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF THE EMBODIMENTS OF THE INVENTION

Hereinafter, embodiments of the present invention will be described in detail with reference to the accompanying drawings. It should be noted that the same reference numerals will denote the same configuration elements in the accompanying drawings, although they may be shown in different drawings. Also, a detailed description of known functions and configurations will be omitted when it may unnecessarily obscure the subject matter of the present invention.

In accordance with an embodiment of the present invention, a particular region in a displayed image is selected and displayed in an enlarged form. More specifically, when a user selects a target region in an image displayed by an image reproduction apparatus, an image of the selected target region is displayed in a window that is adjustable by the user. The image reproduction apparatus tracks a target object in the target region, and enables the user to continuously view the target object in the window. Particularly, the user can adjust a generation position, a window size, a zoom magnification, and a resolution of the window. As described above, the user can freely adjust the window in which the target object is displayed, thereby increasing the convenience of the user.

Figure 1:
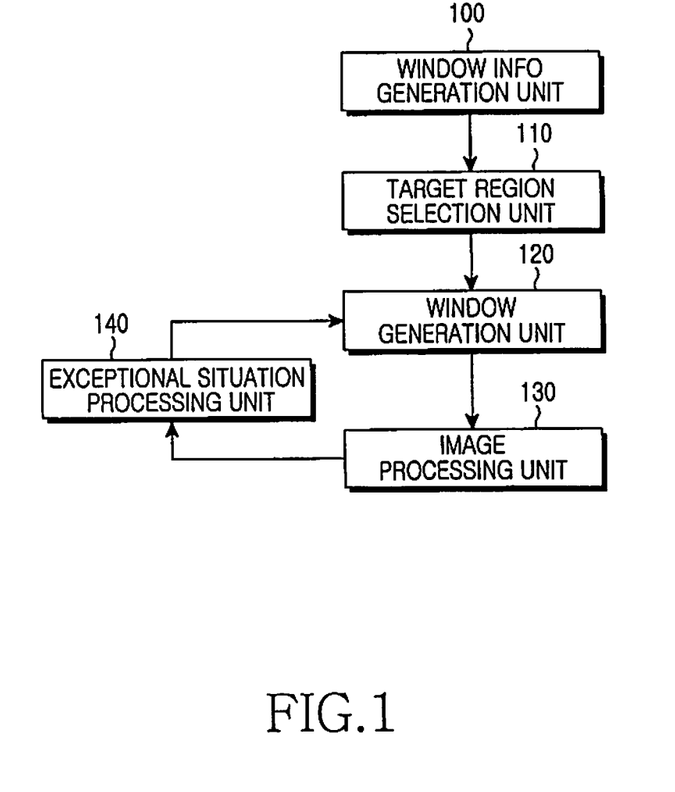
FIG. 1 is a block diagram illustrating an internal configuration of an image reproduction apparatus according to an embodiment of the present invention.

FIG. 1 is a block diagram illustrating an internal configuration of an image reproduction apparatus according to an embodiment of the present invention. Referring to FIG. 1, the image reproduction apparatus includes a window information generation unit 100, a target region selection unit 110, a window generation unit 120, an image processing unit 130, and an exceptional situation processing unit 140.

The window information generation unit 100 receives, as input, generation information for a window to be displayed on a reproduced image in such a manner that the window overlaps the reproduced image. Namely, the window information generation unit 100 receives, as input, setting information for window generation from a user. For example, the user may previously input the above setting information by using a setting menu. Alternatively, the image reproduction apparatus may also include a touch-screen function, which may receive, as input, the setting information from the user through a touch input means (e.g., a touch pen or finger) while reproducing images. When using the touch input means as described above, the user may directly determine the generation parameters (i.e., position, size, etc.) of the window using a predetermined method (e.g., dragging or drawing).

The window generation information includes, for example, information on whether a window display function is turned on or off, setting information on the generation, size, zoom magnification, and resolution of the window, and information on the selection of an automatic or a manual operation of a target region. Herein, the selection of an automatic or a manual operation of a target region implies that a target region including a target object, that the user intends to track, is automatically designated when the user selects the target object in advance. Also, the selection of a manual operation of a target region implies that the user directly designates the target region in an image reproduced through keypad input or touch input.

The target region selection unit 110 receives a target object, which is to be displayed in the window. The target region selection unit 110 receives a target region that the user designates in the displayed image. For example, the selection of the target region indicates a target object (e.g., an object, a human being, or a word) that the user intends to enlarge in a moving image or on the web. When the target object is designated, the target region selection unit 110 continuously tracks the target object while reproducing the image. Namely, the target region selection unit 110 continuously extracts the target object from a reproduced image. For example, face recognition technology can be used when a human being is the target object of the reproduced image. In the same manner, when a different character designated to be extracted, character recognition technology can be used. The extraction technology is publicly-known technology, and therefore, a detailed description of the extraction process of the target object will not be described in further detail in the present application.

Although the target region, as described above, is determined by keypad input or touch input on a touch-screen, a means for designating the target region is not limited to these examples.

The window generation unit 120 generates the window, which displays the target object, by using the window generation information input by the user. Accordingly, a window with the size and resolution set by the user is generated at the requested position.

The image processing unit 130 includes a scaler, and displays an image of the target region in the generated window. Namely, the image processing unit 130 processes an image in such a manner that the target object may be displayed in the window according to the zoom magnification and resolution set by the user. Accordingly, the image processing unit 130 extracts and tracks the target object in the target region, and continuously displays the tracked target object in the generated window at the preset magnification.

The exceptional situation processing unit 140 determines if the position of the window overlaps the target region in the image while reproducing the image. When the overlapping situation occurs, it is preferable that the position of the window should be readjusted. Therefore, the exceptional situation processing unit 140 moves the window to an adjacent position and displays the moved window in such a manner that the window may not overlap the target region. The adjacent position, for example, is a position having a predetermined distance from the target region. Preferably, the size, zoom magnification, and resolution of the window are maintained even when the window is moved.

Figure 2:
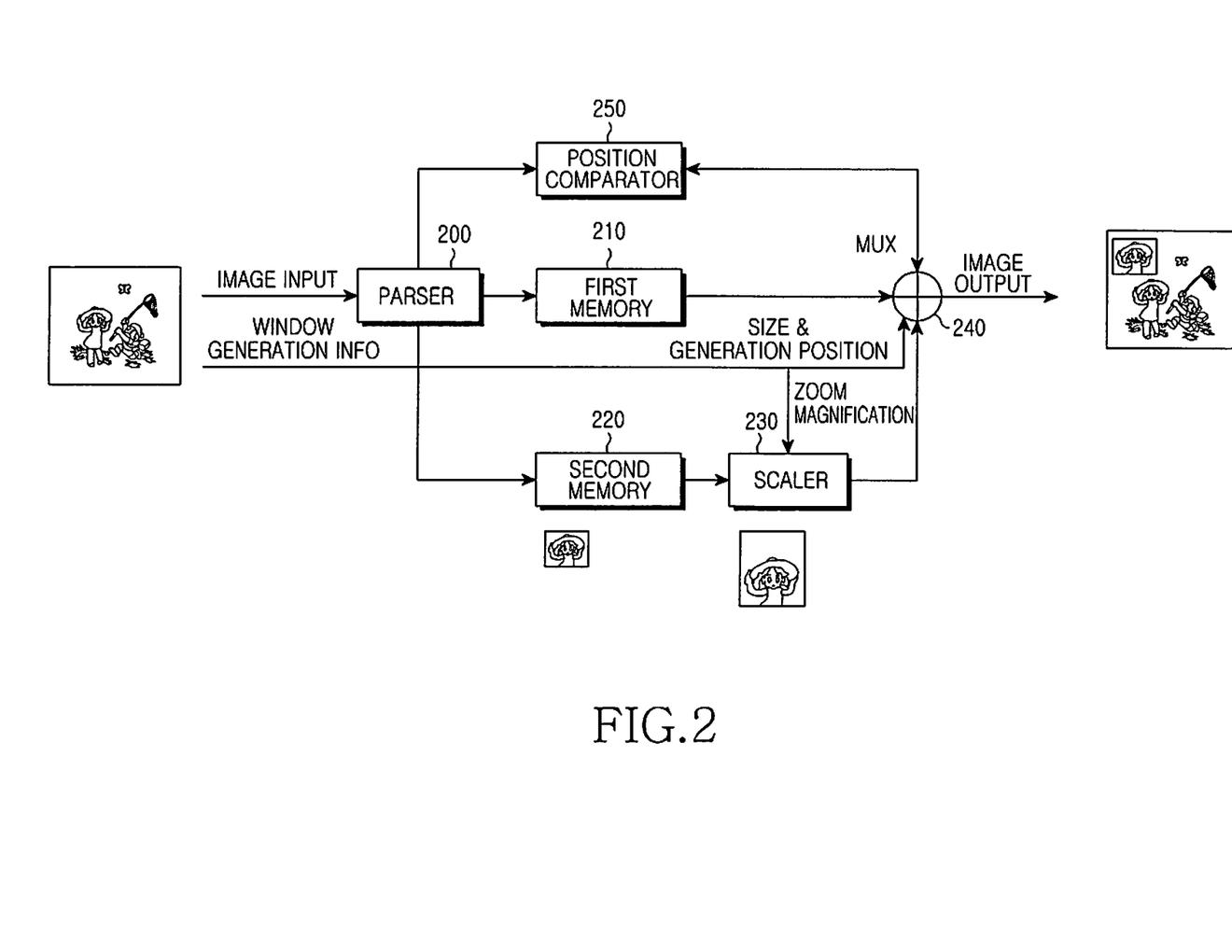
FIG. 2 is a block diagram illustrating a detailed configuration for window processing as illustrated in FIG. 1.

FIG. 2 is a block diagram illustrating window processing. More specifically, FIG. 2 illustrates an image reproduction processing scheme when image reproduction starts.

Referring to FIG. 2, when an image to be reproduced is input, a parser 200 parses information. More specifically, the parser 200 parses information on a target region in the input image. Through this parsing, a first memory 210 temporarily stores the original image. A second memory 220 temporarily stores the information on the target region. The first memory 210 and second memory 220 act as buffers, which temporarily store an image and image information, respectively, before the image is output. Herein, the "original image" is a reproduced moving image, and the "information on a target image" is target objects (such as a Region Of Interest (ROI), an object, a character, a human being, etc., designated by the user), which is intended to be extracted and tracked in the original image.

The scaler 230 scales the target image according to a set zoom magnification from among the window generation information so that the target object may be displayed in the window.

A multiplexer (MUX) 240 combines the original image from the first memory 210 with the target image scaled by the scaler 230. The target image is combined with the original image in the window having the size and generated in a position designated by the user. Accordingly, the target image is displayed in the window having the designated size and position in such a manner that the target image may overlap the original image.

A position comparator 250 compares the position of the target region with that of the window so that the position of the window will not obscure the target object in the original image. When the result of the comparison shows that the position of window overlaps the target region, the position comparator 250 adjusts the position of the window to a position adjacent to the target region, i.e., the nearest position to the target region, at which the window does not overlap the target region. When the window overlaps the target region, a distance between the target region and window may have a predetermined value. Accordingly, the window is continuously displayed without covering the target object when the designated window potion would have overlapped the target object. Preferably, the window only changes its position, and is the same size, uses the same zoom magnification, and displays in the same resolution as set by the user.

The apparatus described above does not simply display an image, such as in a PIP scheme where an image of a predetermined size is displayed at a predetermined position, but continuously tracks and displays the target object, that selected by the user, in a window of which the position, size, zoom magnification, and resolution are also designated by the user.

This function as described above is referred to as a Smart Zoom Window (SZW) function in the present application. The SZW function extracts and tracks a region, an object, or a human being designated by a user from an image, by applying technology, which has been proposed for the reproduction of Digital Multimedia Broadcasting (DMB) and a Video On Demand (VOD) from among functions that users frequently use in mobile terminals. The SZW function reconfigures the tracked target based on a position, size, and resolution set by the user, and displays the reconfigured target on a screen.

Besides the operations described above, the SZW function, for example, continuously counts an appearance frequency of a target object extracted from the image, and displays the appearance frequency.

Figure 3:
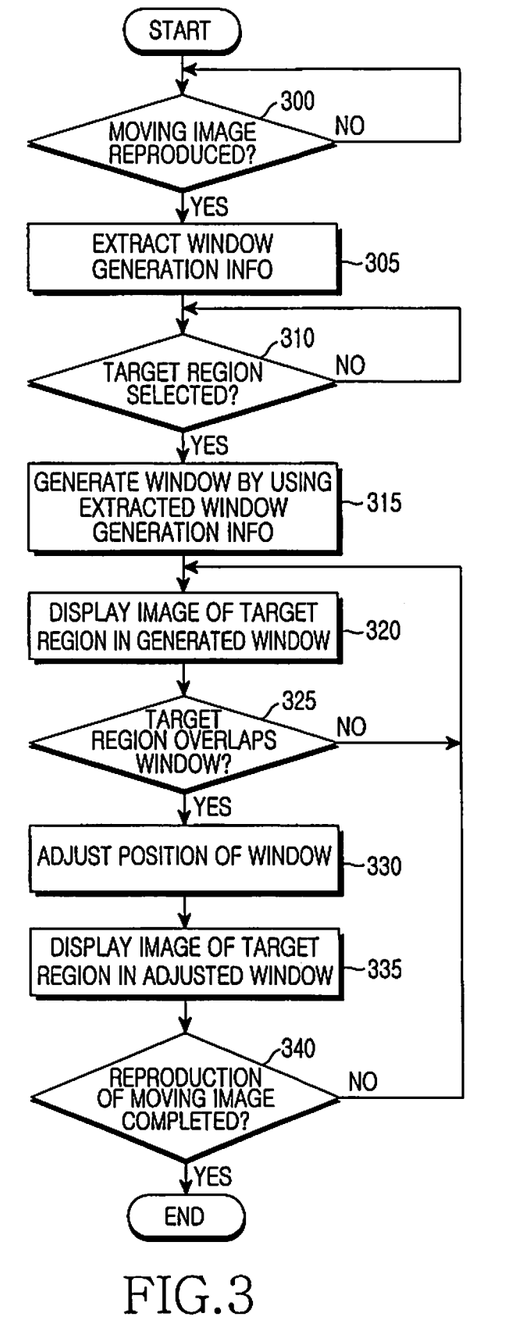
FIG. 3 is a flowchart illustrating an operation for window processing in an image reproduction apparatus according to an embodiment of the present invention.

FIG. 3 is a flowchart illustrating window processing in an image reproduction apparatus according to an embodiment of the present invention. In the following description, although the description will be made with reference to illustrative views of FIGS. 4 and 5, a window display method according to the present invention is not limited to this example.

Referring to FIG. 3, when moving image reproduction starts in step 300, the image reproduction apparatus extracts window generation information in step 305. In step 310, the image reproduction apparatus determines if a target object or region is selected. The step of selecting the target region corresponds to the step of selecting a target object to be tracked, in a reproduced moving image. While the moving image is reproduced, the user can select a target object (e.g., an ROI, a human being, or a particular object). When browsing the web, for example, the user can select a target object (e.g., a character). When the target object is selected, the image reproduction apparatus generates a window by using the extracted window generation information in step 315.

A description is made referring to FIG. 3 on the assumption that the user previously sets, through a menu, stored window setting information including an initial generation position, a size, a zoom magnification, a resolution, etc., of a window. However, the user may also adjust the window according to a desired position and size from among the window generation information by, for example, dragging a touch pen while the moving image is being reproduced.

Also, the zoom magnification and resolution of the window may be directly determined in real time in the same manner while the moving image is being reproduced. Further, the user may easily determine the target region by using a touch pen. When using a keypad, the user may determine a starting position and an end position of a target region by using a direction key, for example.

The image reproduction apparatus displays an image of the target region in the generated window in step 320.

Figure 4:
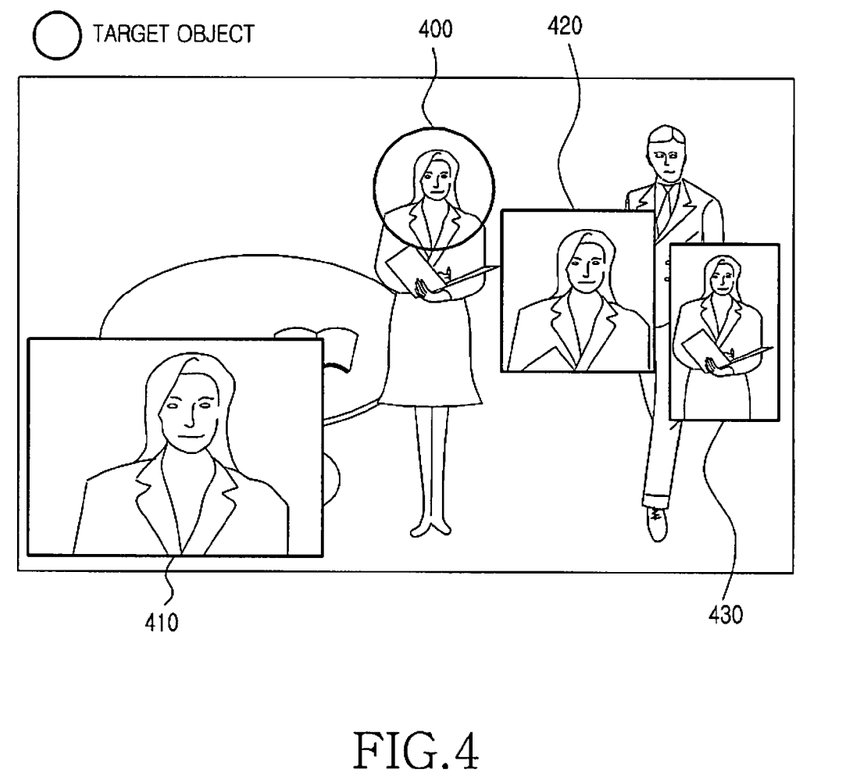
FIG. 4 illustrates a screen of an apparatus when a window is generated according to an embodiment of the present invention.

FIG. 4 illustrates windows of various shapes, which are denoted by reference numerals 410, 420 and 430, and are displayed when a target object 400 is designated in a moving image. The user can set a desired position, size, zoom magnification, and resolution for each of the windows as described above. Therefore, the windows denoted by reference numerals 410, 420 and 430 can have various shapes.

In particular, FIG. 4 illustrates the size of a target region displayed in each of the windows 410, 420, and 430 being different when sizes of the windows 410, 420, and 430 are different, although target objects are the same. Namely, the target object always exists in the center of each of the windows 410, 420 and 430. However, the size of the target region including the target object changes depending on the size, zoom magnification, etc., of the window.

The target object 400 is continuously extracted and tracked in the moving image. Accordingly, an image of the target region with the target object 400 as reference is continuously displayed in each window. If recognition technology is integrated with extraction and tracking technology when the target object is extracted and tracked in the moving image, it is possible to count the appearance frequency of the target object.

Figure 5:
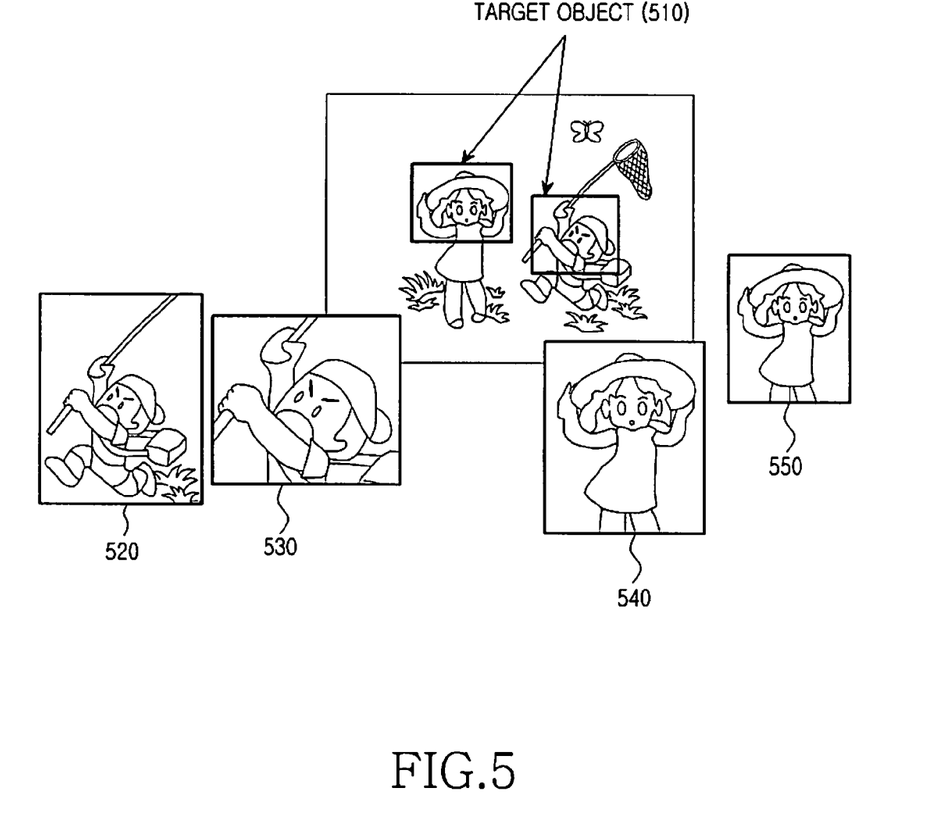
FIG. 5 illustrates a screen on which a target object is viewed in a window according to an embodiment of the present invention.

It is also possible to designate more than one target object, as illustrated in FIG. 5.

Referring to FIG. 5, target objects 510 are displayed in windows 520, 530, 540 and 550, respectively. More specifically, FIG. 5 illustrates windows 520, 530, 540, and 550, which have different sizes and also different zoom magnifications, respectively. For example, when only a person's face is designated as the target region in a preview image in the image reproduction apparatus (e.g., a mobile terminal) equipped with a camera, the person's face, which is enlarged and more accurate, is displayed in the window. Accordingly, the user can easily photograph the person.

While displaying a target object in a window in such a manner that the window may overlap the target in a reproduced image, as illustrated in FIGS. 4 and 5, the image reproduction apparatus determines in step 325 if the window overlaps the target region. When the window overlaps the target region, the image reproduction apparatus readjusts the position of the window in step 330. Then, the image reproduction apparatus displays an image of the target region in the window having the adjusted position in step 335. This operation prevents a window from obscuring the target object while the image is reproduced. Accordingly, the image reproduction apparatus moves the window to a position adjacent to the target region, and displays the moved window.

In step 340, the image reproduction apparatus continuously extracts and tracks the target object in the moving image, and displays the target object in the window, as long as the reproduction of the moving image is not completed. In accordance with an embodiment of the present invention, a target object can be actively and intelligently displayed in a window.

In accordance with an embodiment of the present invention, an image reproduction apparatus recognizes a target object and displays the recognized target object in a window while a moving image is reproduced. However, the present invention may also be applied when the target object (e.g., text characters) designated by a user, is displayed in a desired window 610 even on a character output screen as illustrated in FIG. 6.

Figure 6:
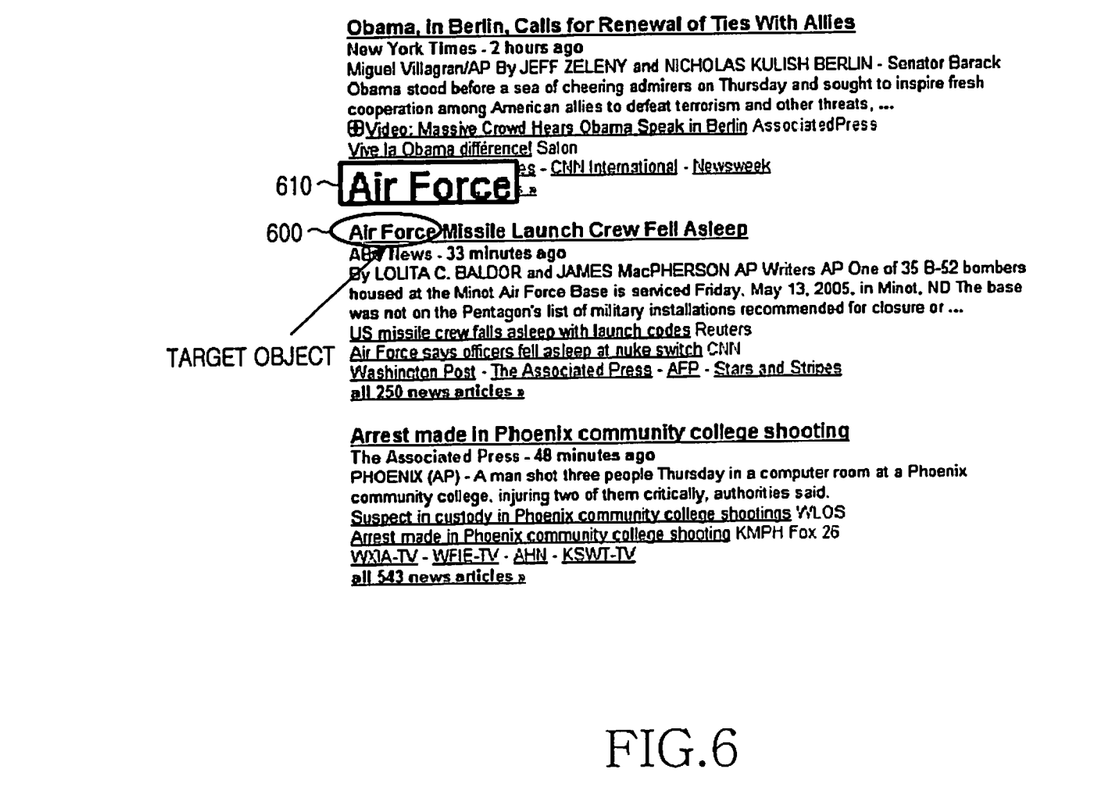
FIG. 6 illustrates a window display screen for improving document readability according to an embodiment of the present invention.

Referring to FIG. 6, when the user designates a word as the target object, the image reproduction apparatus recognizes the relevant word and displays the recognized word in the window, which is set by the user. Additionally, the number of times that the recognized word appears can be tracked. For example, when the user must read user data (e.g., web surfing data or a web surfing text) by using a small display device mounted on a mobile terminal, the invention eliminates the inconvenience that the user has to read small characters. Accordingly, the enlarged view in the window can improve the readability of the user data.

The various embodiments of the present invention enable a user to continuously view an image of a particular region, which has been selected from an image displayed, in an image reproduction apparatus (e.g., a TV or a mobile terminal), according to a desired position, size, and resolution.

While the present invention has been shown and described with reference to certain embodiments thereof, it will be understood by those skilled in the art that various changes in form and details may be made therein without departing from the spirit and scope of the present invention as defined by the appended claims and equivalents of the appended claims.

What is claimed is:

1. A method for displaying an enlarged target region of an image reproduced by a mobile terminal, the method comprising:
   displaying a moving image;
   receiving a first touch input for designating at least one target region in the moving image;
   recognizing at least one object in the designated target region, in accordance with the first touch input;
   tracking the recognized object;
   receiving a second touch input for setting information for generation of a window, from a user;
   generating the window on a first position of the displayed moving image, in accordance with the second touch input;
   displaying the tracked object through the generated window in accordance with the generation of the window, while reproducing the moving image, wherein the tracked object is tracked from the moving image in accordance with the first touch input and a displayed area of the tracked object is changing in the displayed moving image according to the reproducing; and
   changing the first position of the generated window where the tracked object is displayed, when the displayed area of the tracked object in the moving image is overlapped by the generated window where the tracked object is displayed.

2. The method as claimed in claim 1, wherein the tracked object is overlapped on a part of the moving image which is being reproduced.

3. The method as claimed in claim 1, wherein the at least one target region is designated when the first touch input is received from a touch pen or finger.

4. The method as claimed in claim 1, wherein the at least one object includes one of a Region Of Interest and a particular object.

5. The method as claimed in claim 1, further comprising:
   determining, by the mobile terminal, if the window overlaps with the designated target region in the moving image.

6. The method as claimed in claim 1, wherein if more than two objects are recognized, the more than two objects are displayed in respective windows.

7. The method as claimed in claim 1, wherein the setting information for generation of the window includes at least one of a generation position, a size, a zoom magnification, and a resolution of the window.

8. A mobile terminal for displaying an enlarged target region of a reproduced image, the mobile terminal comprising:
   a display for displaying a moving image;
   a touch-screen for receiving a first touch input for designating at least one target region in the moving image, and receiving a second touch input for setting information for generation of a window, from a user; and
   a processor for:
      recognizing at least one object in the designated target region, in accordance with the first touch input, tracking the recognized object;
      generating the window on a first position of the displayed moving image, in accordance with the second touch input;
      controlling the display to display the tracked object through the generated window in accordance with the generation of the window, while reproducing the moving image, wherein the tracked object is tracked from the moving image in accordance with the first touch input and a displayed area of the tracked object is changing in the displayed moving image according to the reproducing; and
      changing the first position of the generated window where the tracked object is displayed, when the displayed area of the tracked object in the moving image is overlapped by the generated window where the tracked object is displayed.

9. The mobile terminal as claimed in claim 8, wherein the tracked object is overlapped on a part of the moving image which is being reproduced.

10. The method as claimed in claim 8, wherein the processor automatically designates the at least one target region when the at least one target region is selected by a touch pen or finger.

11. The method as claimed in claim 8, wherein the at least one object includes one of a Region Of Interest and a particular object.

12. The method as claimed in claim 8, wherein the processor determines if the window overlaps with the designated target region in the moving image.

13. The mobile terminal as claimed in claim 8, wherein the setting information for the generation of the window comprises at least one of a generation position, a size, a zoom magnification, and a resolution of the window.

14. The mobile terminal as claimed in claim 8, wherein if more than two objects are recognized, the more than two objects are displayed in respective windows.

\* \* \* \* \*